United States Patent
Krause et al.

(10) Patent No.: US 8,029,731 B2
(45) Date of Patent: Oct. 4, 2011

(54) DEVICE FOR MEASURING/DETERMINING A PHYSICAL QUANTITY OF A MEDIUM

(75) Inventors: Michael Krause, Singapore (SG); Florian Stengele, Romas sllsère (FR)

(73) Assignee: Endress + Hauser GmbH + Co. KG, Maulburg (DE)

( * ) Notice: Subject to any disclaimer, the term of this patent is extended or adjusted under 35 U.S.C. 154(b) by 1880 days.

(21) Appl. No.: 10/333,913

(22) PCT Filed: Jul. 25, 2001

(86) PCT No.: PCT/EP01/08569
§ 371 (c)(1),
(2), (4) Date: Aug. 7, 2003

(87) PCT Pub. No.: WO02/12834
PCT Pub. Date: Feb. 14, 2002

(65) Prior Publication Data
US 2004/0101717 A1    May 27, 2004

(30) Foreign Application Priority Data

Aug. 3, 2000 (DE) .................................. 100 37 911

(51) Int. Cl.
G01N 15/06 (2006.01)
G01N 21/00 (2006.01)
G01N 25/20 (2006.01)
G01N 35/00 (2006.01)

(52) U.S. Cl. ... 422/68.1; 422/76; 422/82.05; 422/82.12; 73/1.02; 73/53.01; 436/43; 436/147; 436/148

(58) Field of Classification Search ................ 422/68.1, 422/82.05; 204/228.2; 73/1.02, 53.01
See application file for complete search history.

(56) References Cited

U.S. PATENT DOCUMENTS

| | | | | |
|---|---|---|---|---|
| 3,342,558 A * | 9/1967 | Reinecke | ...................... | 205/787 |
| 4,185,143 A * | 1/1980 | Birt et al. | ...................... | 429/119 |
| 4,627,445 A * | 12/1986 | Garcia et al. | ................... | 600/583 |
| 4,789,804 A * | 12/1988 | Karube et al. | ................ | 310/311 |
| 5,279,294 A * | 1/1994 | Anderson et al. | ............. | 600/322 |
| 5,296,374 A * | 3/1994 | Culshaw et al. | ........... | 435/287.9 |
| 5,763,113 A * | 6/1998 | Meltser et al. | ................... | 429/13 |
| 5,796,345 A * | 8/1998 | Leventis et al. | ................ | 340/604 |
| 6,217,744 B1* | 4/2001 | Crosby | ......................... | 205/775 |
| 6,250,132 B1* | 6/2001 | Drzewiecki | ................... | 73/23.2 |

FOREIGN PATENT DOCUMENTS

DE 19501013 A1 7/1996
DE 19929343 A1 12/2000

* cited by examiner

Primary Examiner — Jill Warden
Assistant Examiner — Neil Turk
(74) Attorney, Agent, or Firm — Bacon & Thomas, PLLC

(57) ABSTRACT

A device for measuring/determining a physical quantity of a medium. The device comprises a sensor part and an electronic part, whereby at least the electronic part is arranged inside a housing and at least one fuel cell is provided which at least partially covers the energy demand of the device.

9 Claims, 2 Drawing Sheets

DEVICE FOR MEASURING/DETERMINING A PHYSICAL QUANTITY OF A MEDIUM

FIELD OF THE INVENTION

The invention relates to a device for measuring/determining a physical quantity of a medium, in which the device has a sensor part and an electronic part.

BACKGROUND OF THE INVENTION

For determining a physical measured quantity, the most various types of sensors are used, some of which are based on quite different physical measurement principles. For instance, the level of a product in a container is ascertained by way of the transit time of ultrasound waves or electromagnetic waves and in particular microwaves that are reflected from the surface of the product. When microwaves are used, they are either projected freely into the container in the direction of the surface of the product, or the microwaves are passed into the container along a conductive element.

Moreover, capacitive and radiometric measurement methods are used to measure fill levels.

For limit state detection, the resonant frequency of an oscillator bar or an oscillatable structure that comprises a plurality of oscillator bars is preferably evaluated. In this measuring method, the effect that the resonant frequency differs depending on whether the oscillator bars execute their oscillations freely or in contact with the product is utilized.

No matter how different in structure the various measuring devices are for determining the fill level or some other physical quantity, they have one thing in common: They require energy. In the normal situation, this energy is supplied to them via electrical cords. The disadvantage of all the known measuring devices is now considered to be that the cabling required for supplying energy requires a relatively complicated and expensive installation. The cables themselves are moreover naturally relatively expensive.

It is indeed also known to position solar cells for supplying energy in the vicinity of the measuring devices, but using solar cells is limited to only a few exceptional cases, for well known reasons; solar cells can function only when they are exposed at least intermittently to direct sunlight.

SUMMARY OF THE INVENTION

The object of the invention is to provide an economical device for measuring and/or determining a physical measured quantity.

This object is attained in that at least the electronic part is disposed in a housing, and that at least one fuel cell is provided, by way of which the energy demand of the device is at least partially covered.

Fuel cells per se are prior art. As reaction gases, hydrogen and oxygen are for instance used. These gases are separated from one another by a very thin proton-conducting membrane, which has a thin platinum coating on both sides. Simultaneously, this membrane reinforces the generation of electrical energy, since it decomposes the hydrogen into protons and electrons. The protons migrate through the membrane to the oxygen and bond with the oxygen to form water. For the electrons, the membrane is impermeable. Because of the electron excess on the hydrogen side and the electron lack on the oxygen side, positive and negative poles form. If the two poles are connected to one another, an electric current flows, which can be utilized to operate the device.

The advantage of the device of the invention is that the measuring device no longer need to have wiring or cabling. This has a particularly favorable effect if the measuring device of the invention is used areas at risk of explosion, where cabling/wiring must moreover meet the applicable specified standards. It is therefore self-evident that by eliminating the cabling, a considerable reduction in the cost per measurement site is attained.

In an advantageous refinement of the device of the invention, the physical measured quantity is for instance the fill level, density, pressure, flow rate, temperature, or chemical composition of a process medium.

In a preferred feature of the device of the invention, the at least one fuel cell is disposed in the housing, with which both the electronic part and the sensor part are integrated. However, it is also possible to separate the sensor part from the electronic part of the measurement device and to provide both parts in different housings. Correspondingly, then the at least one fuel cell can for instance also be disposed in the housing in which the electronic part is accommodated. In the final analysis, how the fuel cell or fuel cells are installed depends on whether the measuring device is a compact sensor, in which the sensor part and electronic part are integrated in one unit, or whether the sensor part is spatially separated from the electronic part. In this latter case, it is naturally appropriate to provide the at least one fuel cell in the immediate vicinity of the electronic part, since it is there that the energy is typically used. Moreover, the unit that contains the electronic part is more easily accessible from outside than the sensor part disposed in the process medium or in the vicinity of the processed medium, and naturally this simplifies charging the fuel cell or cells considerably.

An advantageous refinement of the device of the invention provides a data line by way of which the measurement data that represent the physical quantity are transmitted to a remote control point. In particular, a microprocessor is provided, which is disposed in the housing and which evaluates the measurement data of the physical quantity and transmits the information via the data line to the remote control point and/or which communicates with the remote control point via the data line.

An alternative feature of the device of the invention proposes that a transceiver unit is provided, which is disposed in the housing, and wherein the transceiver unit transmits the measurement data of the physical quantity in wireless fashion to the remote control point and/or wherein the transceiver unit communicates in wireless fashion with the remote control point. This preferred feature of the device of the invention consequently involves a completely autonomous system. As a result, it is on the one hand naturally quite simple to install the measuring device; on the other, the cabling can be dispensed with entirely.

The measuring device is preferably designed in such a way that the customer can no longer open it. With this provision, complicated housing constructions that are typically used for partitioning the externally accessible measuring device off from external influences can be dispensed with. This feature of the measuring device in particular becomes possible for the first time because no cables and consequently no cable leadthroughs are present in the measuring device any longer. Because of the simplified construction of the measuring device, the production costs can be reduced considerably.

In measurements in regions where there is a risk of explosion, an advantageous feature of the device of the invention furthermore provides that the housing is an encapsulated housing.

To make it possible to continuously assure the operation of the device of the invention, one embodiment of the device of the invention provides that the microprocessor outputs a warning/error report as soon as the at least one fuel cell reaches a predetermined threshold value, and this threshold value is defined such that the energy supply of the fuel cell is no longer adequate for more than a defined, limited period of time. A closed control loop is also provided, which assures that the energy furnished by the fuel cell is made available as a function of the particular power demand.

In a preferred feature of the device of the invention, a charger unit is provided, by way of which the at least one fuel cell can be charged. In particular, the charger unit is an injector. As a result, it is possible to charge the fuel cell within a very short time. This makes it possible to eliminate downtimes of the measuring device completely.

BRIEF DESCRIPTION OF THE DRAWINGS

The invention is described in further detail in conjunction with the following drawings. Shown are.

DESCRIPTION OF THE PREFERRED EMBODIMENTS

Figure 1:
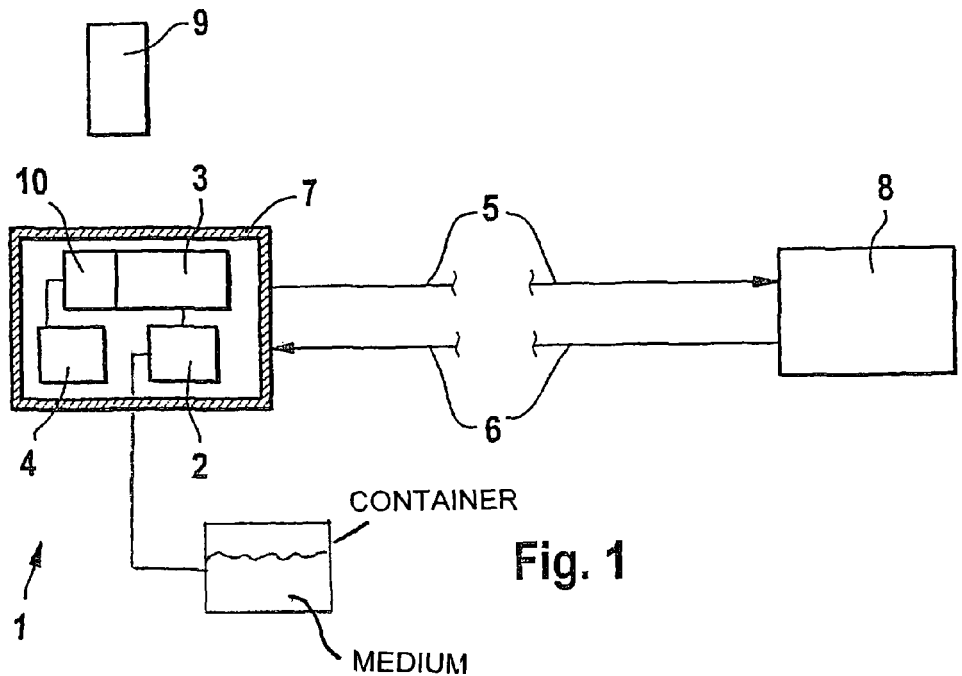
FIG. 1: which is a schematic illustration of a first embodiment of the device of the invention.

FIG. 1 shows a schematic illustration of a first embodiment of the device of the invention. The measuring device 1 is a so-called compact sensor, in which the sensor part 2 and the electronic part 3 are accommodated in one housing 7. The exchange of data and information with a remote control point 8 is accomplished via the data lines 5, 6. The energy supply to the device 1 is assured via the fuel cell 4, which is likewise provided in the housing 7.

A microprocessor 10 monitors the instantaneous load state of the fuel cell 4, among other things. As soon as an assured energy supply for only a defined, limited period of time exists, an error report and/or a warning signal is output, which tells the operator or operators that the fuel cell 4 has to be charged. In the simplest case, the charging of the fuel cell 4 is done by means of an injector 9.

Figure 2:
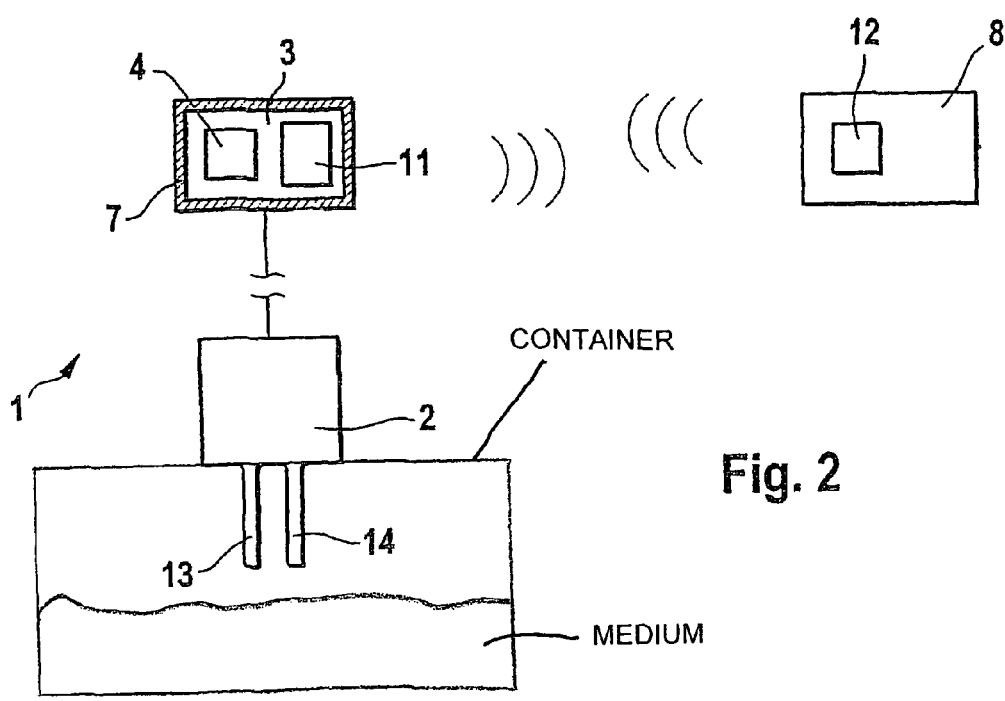
FIG. 2: which is a schematic illustration of a second embodiment of the device of the invention.

In FIG. 2, a schematic illustration of a second embodiment of the device 1 of the invention is shown. In this embodiment, the sensor part 2 and the electronic part 3 are accommodated in two housings spatially separated from one another. For instance, the sensor part 2 is positioned in such a way that it comes into contact with the process medium, while the electronic part 3 is located outside the container that contains the process medium to be measured or monitored.

The exchange of data and information between the measuring device 1 and the remote control point 8 is effected by radio in this embodiment. To that end, both the measuring device 1 and the remote control point 8 are each assigned a respective transceiver unit 11, 12.

In the case shown, the measuring device 1 is also a vibration detector, for limit state detection of the level of a product in a container. As already mentioned above, such sensors detect the level on the basis of a change in the resonant frequency of an oscillatable structure. In the case illustrated, the oscillatable structure is two oscillator bars 13, 14, which are disposed in the form of a tuning fork. Such vibration detectors are well known in the prior art and are sold by the present Applicant for instance under the designation "Liquiphant".

Figure 3:
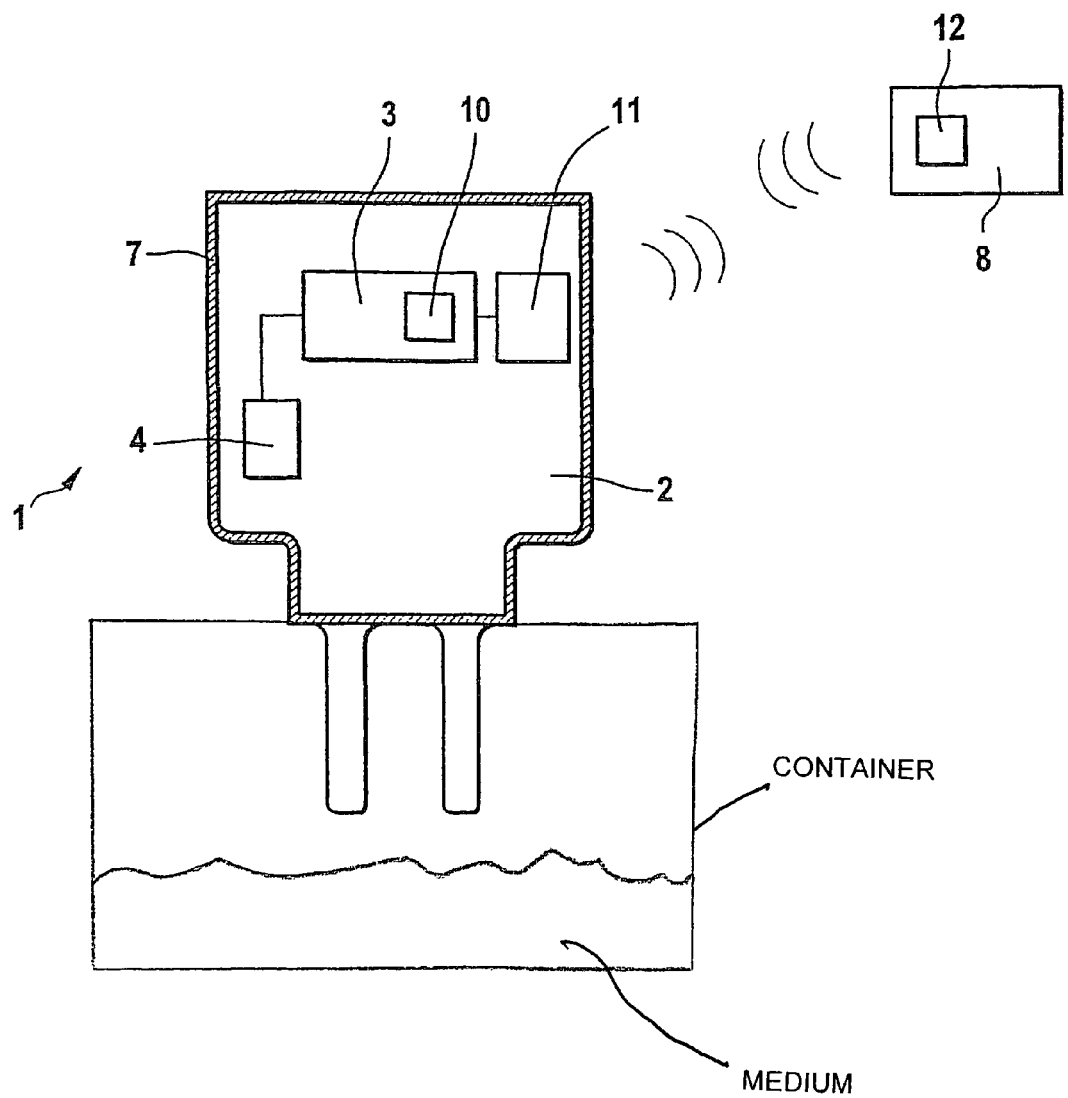
FIG. 3: which is a schematic illustration of a third embodiment of the device of the invention.

An especially preferred embodiment of the device of the invention is shown in FIG. 3. This embodiment involves an autonomous system, since no wiring or cable systems whatever that connect a measuring device 1 with other units are provided. Once again, the measuring device 1 is a compact sensor: The sensor part 2 and electronic part 3 are disposed in one housing 7. The measuring device 1 is supplied with energy via the fuel cell 4, which is likewise disposed in the housing 7. The exchange of data and information with the control point 8 is effected in wireless fashion by radio. As already noted above, on the one hand the measuring device 1 can naturally be installed quite simply; on the other, the expensive wiring/cabling can be dispensed with entirely. Since no cable leadthroughs are needed, and since the charging of the fuel cell can be done in a simple way from outside—for instance by means of an injector—the housing 7 can be constructed quite simply; both simplifications are expressed in reduced production costs.

The invention claimed is:

1. A device for determining a physical quantity of a process medium in a container which is chosen from the group consisting of pressure, flow rate, temperature, and chemical composition, comprising:

a sensor part;

an electronic part;

at least one fuel cell, said sensor part, said electronic part and said at least one fuel cell being electrically connected, wherein:

said electronic part and said at least one fuel cell are disposed in one housing;

said housing is spatially separated from said sensor part in such a way that said sensor part is disposed in the process medium or in the vicinity of the process medium, while said electronic part is located outside the container that contains the process medium; and a closed control loop, assures that the energy furnished by the fuel cell is made available as a function of the particular power demand of said sensor part and of said electronic part.

2. The device as defined in claim 1, further comprising:

a remote control point; and at least one data line connecting said remote control point with the combination of said sensor part and said electronic part, by way of which the measurement data of the physical quantity is transmitted to said remote control point.

3. The device as defined in claim 2, further comprising:

a microprocessor disposed in said housing, wherein:

said microprocessor evaluates the measurement data generating information thereby, and transmits said information via said at least one data line to said remote control point.

4. The device as defined in claim 2, further comprising:

a microprocessor disposed in the housing, wherein:

said microprocessor communicates with said remote control point.

5. The device as defined in claim 2, further comprising:
a transceiver unit disposed in the housing, wherein:
said transceiver transmits the measurement data of the physical quantity in a wireless fashion to said remote control point.

6. The device as defined in claim 2, further comprising:
a transceiver unit disposed in the housing, which communicates in wireless fashion with said remote control point.

7. The device as defined in claim 1, wherein:
the housing is an encapsulated housing.

8. The device as defined in claim 2, further comprising:
a microprocessor disposed in the housing, wherein:
said microprocessor outputs a warning/error report as soon as at least one fuel cell no longer adequately covers the energy demand of said device.

9. The device as defined in claim 1, further comprising:
a charger unit connected to at least one fuel cell, said charger unit serving to charge said at least one fuel cell when necessary.

\* \* \* \* \*